UNITED STATES PATENT OFFICE.

JOHN H. POWER AND RUFUS M. POWER, OF CHICO, TEXAS.

ARTIFICIAL STONE.

SPECIFICATION forming part of Letters Patent No. 535,995, dated March 19, 1895.

Application filed December 27, 1894. Serial No. 533,105. (No specimens.)

*To all whom it may concern:*

Be it known that we, JOHN H. POWER and RUFUS M. POWER, citizens of the United States, residing at Chico, in the county of Wise and State of Texas, have invented a new and useful Artificial Stone, of which the following is a specification.

This invention relates to artificial stone of that class wherein the composition has cement or the several variations thereof for its base; and it consists in a peculiar composition of matter whereby this class of artificial stone is improved and made more effective for the purpose in hand. Thus by means of our invention a stone is produced which will harden under water, and which, when undergoing the process of hardening, will not be affected by the water. Also, by reason of certain hereinafter specified ingredients, it is made a non-conductor of heat. Various other desirable effects are attained, and all will be fully described hereinafter.

The invention also embodies a peculiar process by which the ingredients of our composition are combined, and by which they are made to have the necessary co-operative relation or affinity to each other. It is essential to our invention that this process be carried out in making the stone, for by its means alone the necessary results are brought about.

To these ends our invention consists of a composition of matter having the following formula: Quanah cement, five gallons; Portland cement, two gallons; sand, ten gallons; alum, one gill; salt, one gill; gum arabic, one-half gill; sulphur, one-half gill. These ingredients are combined by the following process: The sand and Portland and Quanah cements are combined with sufficient water to make a stiff plastic compound, to which the sulphur is added during the process of mixing. This addition of the sulphur should be gradual and regular, so that it will have the proper effect upon the sand and cements. Next, the salt, alum and gum arabic in one gallon of water should be dissolved; and to insure the complete dissolution of these ingredients, and to prepare them for their association with the other parts, the water should be boiled for a reasonable time. This solution should finally be added to the first mixture by pouring it slowly into the same, and by continually stirring said first mixture during the operation. The composition is now complete, and when it is desired to form it into blocks or other shapes it should be placed in suitable molds and left therein until it sets. This will consume about forty minutes of time, at the end of which the composition will be hardened and ready for use as stone.

The product of our invention is a beautiful light gray stone, hard in composition, and making an excellent imitation of light gray marble. By adding to the above formula one pound of gun powder, the product will have a clouded appearance resembling clouded marble.

The alum used in our composition co-operates with the other elements thereof and gives the product the capability of repelling heat, or makes it a non-conductor. The salt is necessary to the process, and in this connection serves to check the hardening operation and to make the same slow enough to allow the molecules or parts thereof to properly settle against each other, so that the composition will be solid and dense. The gum arabic is also useful, indeed necessary, to the effectiveness of the process, and in this connection operates to help the settling of the composition and to make it, when complete, dense and solid. It further operates to impart to the completed article that gloss which makes it such a good imitation of marble. Lastly, the sulphur, by an affinity which it bears to the other elements, results in a bleached appearance in the completed stone, and gives the same the light color characteristic thereof.

Quanah cement is derived from the gypsum rock of Texas, which is a native rock of that country, and which is first crushed and then bolted or screened in its manufacture, it being rendered ready for use by mixture with water, as in other cements.

Our invention is primarily adapted for building purposes, but may be used for various other objects.

Having described the invention, we claim—

1. A composition of matter, consisting of Quanah cement, Portland cement, sand, alum, salt, gum arabic, and sulphur, combined in the manner and proportions substantially as described.

2. The method herein described of forming artificial stone, which consists in mixing sand, Portland cement and Quanah cement with water, and in thoroughly combining the same, secondly, in adding sulphur to the compound simultaneously with the stirring thereof, thirdly, in dissolving salt, alum and gum arabic in water and boiling the solution, and finally in combining said solution with the sand, cements and sulphur, substantially as specified.

In testimony that we claim the foregoing as our own we have hereto affixed our signatures in the presence of two witnesses.

JOHN H. POWER.
RUFUS M. POWER.

Witnesses:
FRANCIS M. WAGGONER,
ISAAC A. MOORE.